W. G. Smith.
Harvester Cutter.

No. 30,595.  Patented Nov. 6. 1860.

UNITED STATES PATENT OFFICE.

WILLIAM G. SMITH, OF ELIZABETHPORT, NEW JERSEY.

IMPROVEMENT IN THE CUTTING APPARATUS OF HARVESTERS.

Specification forming part of Letters Patent No. 30,595, dated November 6, 1860.

*To all whom it may concern:*

Be it known that I, WM. G. SMITH, of Elizabethport, in the county of Union, in the State of New Jersey, have invented a new and useful Improvement in Cutting Apparatus for Harvesters; and I do hereby declare that the following is a full and exact description thereof, reference being had to the accompanying drawings, and to the letters of reference marked thereon.

My invention relates to certain new and useful improvements in the cutting apparatus of harvesters; and my invention consists in the employment of a cutter-bar which has a slot horizontally from back to front edge, as hereinafter described, in combination with dovetailed ends to the cutter-sections, and adjustable securing shoe-pieces, and a triangular wedge, as hereinafter fully explained.

To enable those skilled in the art to make and use my invention, I will proceed to describe its construction and operation, referring by letters to the accompanying drawings, forming part of this specification, and in which—

Figure 2:
Figure 4:
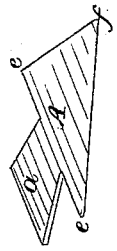
Figure 5:
Figure 3:
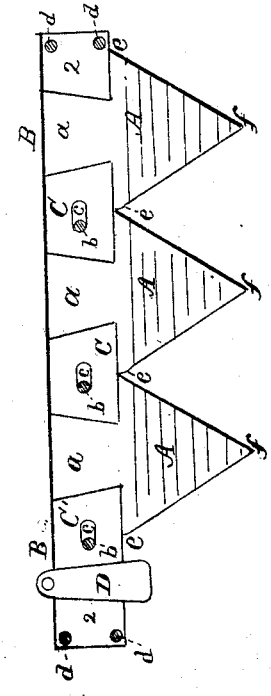
Figure 1:
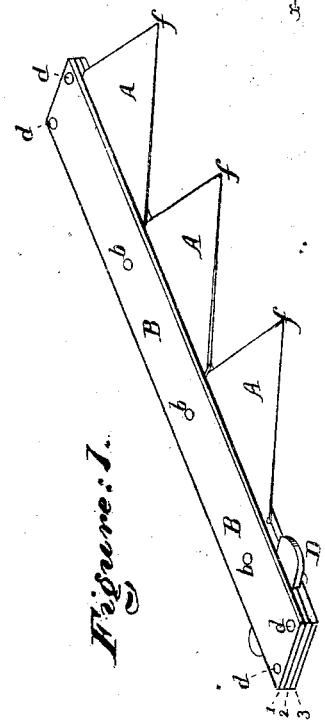
Figure 6:

Figure 1 is a perspective view of a cutter-bar and cutters constructed after my invention. Fig. 2 is a rear elevation of the same. Fig. 3 is a horizontal section at the line $x\ x$, Fig. 2. Fig. 4 is a perspective view of one of the cutter-sections. Fig. 5 is a perspective view of one of the adjustable securing blocks or shoes, and Fig. 6 is a perspective view of the tightening-wedge.

In the different figures the same part of the apparatus is indicated by the same letter.

A are the two sections. The two cutting-edges of each are ground in the usual way and form with the line of the base about an equilateral triangle. These cutter-sections A, when arranged in the bar B for use, constitute what is known as the "scalloped" cutter, as illustrated at Figs. 1 and 3. Each of said sections A is formed with a dovetail-shaped butt or tail-piece, $a$, (see Figs. 3 and 4,) which is equal in thickness to the slot through bar B, into which said tail-piece $a$ is put. The bar B, I have illustrated as being formed with three thicknesses of sheet metal, one strip, 1, forming the top side of bar, another, 3, forming the under side, and a third thickness, 2, in two short pieces, one at each end, forming the division-plate between the two strips 1 and 3, and each secured by rivets $d$ to said upper and lower strips, 1 and 3. In the hollow space or horizontal slot left between the strips 1 and 3 are arranged on pivots $b$ a series of adjustable blocks, $c\ c'$, which are dovetail shaped, and at one end of the cutter-bar is arranged a removable securing-wedge, D, as seen at Figs. 1, 3, and 6. The blocks or shoes C are each formed with a slot, $c$, near their cutters, through which passes the pin $b$, around which the said shoes C swivel and slide, as will be presently explained.

At Fig. 3 the cutter-sections A, with their dovetailed tail-pieces $a$, and the shoes C C', and wedge D, and cutter-bar B are represented as arranged and secured together in proper relation for operation in the machine, and from this figure will be clearly comprehended the method of holding the cutter-sections firmly in their proper positions in the cutter-bar B, for it will be seen that as the taper of the sides of shoes C corresponds with the taper of tail-pieces $a$, and the pieces C are each and all capable of turning or swiveling on pins $b$, and also of sliding along, (by means of slots $c$,) the said pieces C C' will be caused, by forcing the wedge D in, to adjust themselves, and also the cutter-sections A, in proper positions, and to hold firmly the sections A in such position in the cutter-bar B. One of the shoes, C', it will be observed, is made to taper in the same direction on two sides, in order to accommodate itself perfectly to the tail-piece $a$ of the adjacent cutter, and also to the wedge D.

It will be noticed that by making the removable cutter-sections A of the shape adapted in my improved apparatus, the cutting-edges from points $f$ to heels $e$ may be readily ground and resharpened; and, further, that said edges can be, with perfect facility, ground clear past the corner or heel $e$, which comes near the bar B. It will be seen that by forming the cutter-sections A each with a dovetail-shaped tail-piece, and the employment of a series of adjustable shoes, C, and a wedge, D, in the slotted bar B, as described, a cutting apparatus is afforded in which, by simply withdrawing the wedge D, any one or all of the cutter-sections A can be readily extricated from the bar B for substitutes or sharpening, and also that when it is necessary to arrange and secure the sections in the bar B the driving in of the wedge D causes the sections A to be each and all properly adjusted (by means of their tail-pieces and shoes C) in their proper relation with each other and the bar B, and simultaneously fastened firmly. And it will be understood that this advantage of my improved construction of cutting apparatus is not dependent on the precise form of the tail-pieces, or shoes, or cutter-bar; and I do not wish to limit my invention to such precise form so long as a slotted bar substantially such as mine is employed in connection with self-adjusting shoes and dovetail tail-pieces to the cutter-sections, and a single securing wedge or key, the whole to operate substantially as I have hereinbefore described.

Having described the construction and operation of my improvements in cutting apparatuses of harvesters, what I claim as new, and desire to secure by Letters Patent, is—

The slotted bar B and adjustable securing-blocks C, in combination with the securing wedge or key D and the removable sections A, with the tail-pieces $a$, the whole constructed and operating substantially as described, for the purpose set forth.

In testimony whereof I have hereunto set my hand this 10th day of October, 1860.

WM. G. SMITH.

Witnesses:
P. S. DEVLAN,
J. M. ROPES.